United States Patent
Hatazaki et al.

(10) Patent No.: US 11,152,630 B2
(45) Date of Patent: Oct. 19, 2021

(54) FUEL CELL SYSTEM

(71) Applicant: TOYOTA JIDOSHA KABUSHIKI KAISHA, Toyota (JP)

(72) Inventors: Miho Hatazaki, Nisshin (JP); Kazuo Yamamoto, Toyota (JP); Shigeki Hasegawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/928,103

(22) Filed: Jul. 14, 2020

(65) Prior Publication Data

US 2021/0075036 A1    Mar. 11, 2021

(30) Foreign Application Priority Data

Sep. 6, 2019   (JP) .............................. JP2019-162953

(51) Int. Cl.
*H01M 8/04119*  (2016.01)
*H01M 8/0438*   (2016.01)
*H01M 8/04082*  (2016.01)
*H01M 8/04089*  (2016.01)

(52) U.S. Cl.
CPC ... *H01M 8/04164* (2013.01); *H01M 8/04104* (2013.01); *H01M 8/04201* (2013.01); *H01M 8/04432* (2013.01)

(58) Field of Classification Search
CPC ......... H01M 8/04097; H01M 8/04104; H01M 8/04164; H01M 8/04201; H01M 8/04432; H01M 8/04843; H01M 8/1007
See application file for complete search history.

(56) References Cited

U.S. PATENT DOCUMENTS

2016/0133972 A1   5/2016  Yamamoto et al.

FOREIGN PATENT DOCUMENTS

| JP | 2016103466 A | 6/2016 |
| JP | 2017174534 A | 9/2017 |
| JP | 2017182943 A | 10/2017 |

*Primary Examiner* — Victoria H Lynch
(74) *Attorney, Agent, or Firm* — Dickinson Wright, PLLC (57) ABSTRACT

A control unit of a fuel cell (i) performs, when an estimated value of a storage amount in a storage portion of a gas-liquid separator is larger than a threshold storage amount, a first calculation process of calculating an estimated value of a discharge amount after a drain valve is opened, based on a drain speed which is determined with respect to a differential pressure in a first relationship; and (ii) performs, when the estimated value of the storage amount is equal to or smaller than the threshold storage amount, a second calculation process of calculating the estimated value of the discharge amount, based on a current drain speed determined with respect to an estimated value of a current storage amount in a second relationship that is prepared in advance and in which the drain speed decreases as the estimated value of the storage amount decreases.

4 Claims, 5 Drawing Sheets

FUEL CELL SYSTEM

INCORPORATION BY REFERENCE

The disclosure of Japanese Patent Application No. 2019-162953 filed on Sep. 6, 2019 including the specification, drawings and abstract is incorporated herein by reference in its entirety.

BACKGROUND

1. Technical Field

The present disclosure relates to a fuel cell system.

2. Description of Related Art

There is a known fuel cell system in which fuel gas that is contained in exhaust gas discharged from an anode of a fuel cell and that was not used for power generation is separated from water in the exhaust gas using a gas-liquid separator and is circulated to the fuel cell. In such a fuel cell system, generally, while a drain valve provided on a drain pipe connected to the gas-liquid separator is closed, the water in the exhaust gas is stored in the gas-liquid separator as drain water in a liquid water state. The drain water stored in the gas-liquid separator is discharged when the drain valve is opened.

In the fuel cell system, an estimated value of a storage amount of the drain water stored in the gas-liquid separator or an estimated value of a discharge amount of the drain water discharged from the gas-liquid separator may be calculated. For example, in a technique described in Japanese Unexamined Patent Application Publication No. 2016-103466 (JP 2016-103466 A), such estimated values are calculated in order to control opening and closing of a drain valve. In the technique in JP 2016-103466 A, the estimated value of the discharge amount is calculated by performing time integration on a drain speed that is determined based on a differential pressure between a pressure in a circulation flow passage connected to the gas-liquid separator and a pressure on a downstream side of the drain valve.

SUMMARY

The technique in JP 2016-103466 A is intended for increasing accuracy of estimating an amount of gas discharged from the gas-liquid separator together with the drain water after determination is made that draining from the gas-liquid separator is completed based on a determination using the estimated value of the storage amount and the estimated value of the discharge amount. Thus, in the technique in JP 2016-103466 A, the estimated value of the discharge amount when only drain water is discharged from the gas-liquid separator is obtained, and the estimated value of the discharge amount when gas is discharged together with the drain water from the gas-liquid separator is not taken into consideration.

However, as a result of intensive research, the inventors of the present application have found that if the discharge amount when the storage amount in the gas-liquid separator decreases and gas is discharged from the gas-liquid separator together with the drain water is not taken into consideration, an error in accuracy of estimating the discharge amount may unignorably increase. If the opening and closing of the drain valve is controlled based on the estimated value of the discharge amount without considering such errors, the amount of drain water that is not considered in the estimated value may remain in the gas-liquid separator, which may result in errors in the estimated value of the storage amount. Further, when a large amount of drain water remains in the gas-liquid separator, the drain water may be sucked up by a pump provided on the circulation flow passage to interfere with flow of fuel gas circulated to the fuel cell through the circulation flow passage.

As described above, there is still room for improvement in increasing the accuracy of estimating the discharge amount of the drain water discharged from the gas-liquid separator. This issue is not limited to fuel cell systems that use the estimated value of the discharge amount of the drain water discharged from the gas-liquid separator for controlling opening and closing of the drain valve, but also applies to fuel cell systems that use the estimated value of the discharge amount for other controls.

A technique of the present disclosure can be realized as the following modes.

A first aspect of the disclosure provides a fuel cell system. The fuel cell system includes: a fuel cell, an exhaust gas pipe, a gas-liquid separator, a circulation pipe, a drain pipe, a differential pressure detection unit, and a control unit. The fuel cell is configured to be supplied with a fuel gas and an oxidant gas to generate electric power. The exhaust gas pipe is connected to an anode of the fuel cell and exhaust gas of the fuel cell flows into the exhaust gas pipe. The gas-liquid separator is connected to the exhaust gas pipe and is configured to separate the exhaust gas into drain water that is liquid water and a gas component that includes the fuel gas. The gas-liquid separator has a storage portion configured to store the drain water. The circulation pipe is connected to the gas-liquid separator and is configured to circulate the gas component to the anode of the fuel cell. The drain pipe is connected to the storage portion and has a drain valve configured to open and close the drain pipe. The drain pipe is configured to discharge the drain water from the gas-liquid separator when the drain valve is open. The differential pressure detection unit is configured to detect a differential pressure between a pressure on an upstream side of the storage portion and a pressure on a downstream side of the drain valve. The control unit is configured to control power generation of the fuel cell, calculate an estimated value of a storage amount of the drain water stored in the gas-liquid separator, and calculate an estimated value of a discharge amount of the drain water discharged from the gas-liquid separator while the drain valve is open. The control unit is configured to: (i) perform, when the estimated value of the storage amount is larger than a predetermined threshold storage amount, a first calculation process of calculating the estimated value of the discharge amount after the drain valve is opened, based on a drain speed of the drain water discharged from the gas-liquid separator, which is determined with respect to the differential pressure in a first relationship, the first relationship being prepared in advance with the drain speed uniquely defined with respect to the differential pressure; and (ii) perform, when the estimated value of the storage amount is equal to or smaller than the threshold storage amount, a second calculation process of calculating the estimated value of the discharge amount, based on a current drain speed obtained with respect to an estimated value of a current storage amount in a second relationship that is prepared in advance and in which the drain speed decreases as the estimated value of the storage amount decreases. With the fuel cell system according to the above aspect, during the period in which the storage amount of the drain water in the gas-liquid separator decreases and the gas component is discharged together with the drain water from the gas-liquid separator, the second relationship is used so that it is possible to calculate the estimated value of the discharge amount considering the change in the drain speed in accordance with the storage amount. In addition, during the period in which the storage amount of the drain water in the gas-liquid separator is large and only the drain water is discharged from the gas-liquid separator, the first relationship in which the drain speed is almost constant regardless of the current storage amount is used so that it is possible to accurately estimate the discharge amount. Thus, it is possible to increase the accuracy of estimating the discharge amount of the drain water discharged from the gas-liquid separator after the drain valve is opened.

In the fuel cell system according to the above aspect, the control unit may be configured such that, in the second calculation process, the control unit obtains, in each of predetermined cycles, the drain speed with respect to the estimated value of the storage amount and performs time integration so as to calculate the estimated value of the discharge amount for the each of the cycles, and adds up the estimated value of the discharge amount for the each of the cycles so as to calculate the estimated value of the storage amount during a period in which the second calculation process is performed. In the fuel cell system with this configuration, the change in the drain speed in accordance with the storage amount is appropriately considered in the second calculation process of performing a sequential calculation at a predetermined cycle. Therefore, it is possible to increase the accuracy of estimating the discharge amount.

In the fuel cell system according to the above aspect, the second relationship may include a plurality of regions with different rates of change in the drain speed with respect to the estimated value of the storage amount. In the fuel cell system with this configuration, the relationship between the storage amount and the drain speed, which varies depending on the structure of the gas-liquid separator can be appropriately considered in the second relationship. Thus, it is possible to further increase the accuracy of estimating the discharge amount.

In the fuel cell system according to the above aspect, the control unit may configured to close the drain valve, after the estimated value of the storage amount calculated based on the estimated value of the discharge amount becomes equal to or smaller than a predetermined valve closing threshold after the drain valve is opened. In the fuel cell system with this configuration, the drain valve can be closed at an appropriate timing based on the estimated value of the discharge amount.

The technique of the present disclosure can be implemented in various modes other than the fuel cell system. For example, the technique can be implemented in modes such as a vehicle on which the fuel cell system is mounted, a method for controlling the fuel cell system, a method for obtaining a drain speed from a gas-liquid separator included in the fuel cell system, a drain valve control method and a drainage method for the fuel cell system, a method for estimating a discharge amount, a method for controlling opening and closing of a drain valve, a control device and a computer program for implementing these methods, and a non-transitory storage medium storing the computer program.

BRIEF DESCRIPTION OF THE DRAWINGS

Features, advantages, and technical and industrial significance of exemplary embodiments of the disclosure will be described below with reference to the accompanying drawings, in which like signs denote like elements, and secondary.

DETAILED DESCRIPTION OF EMBODIMENTS

1. First Embodiment

Figure 1:
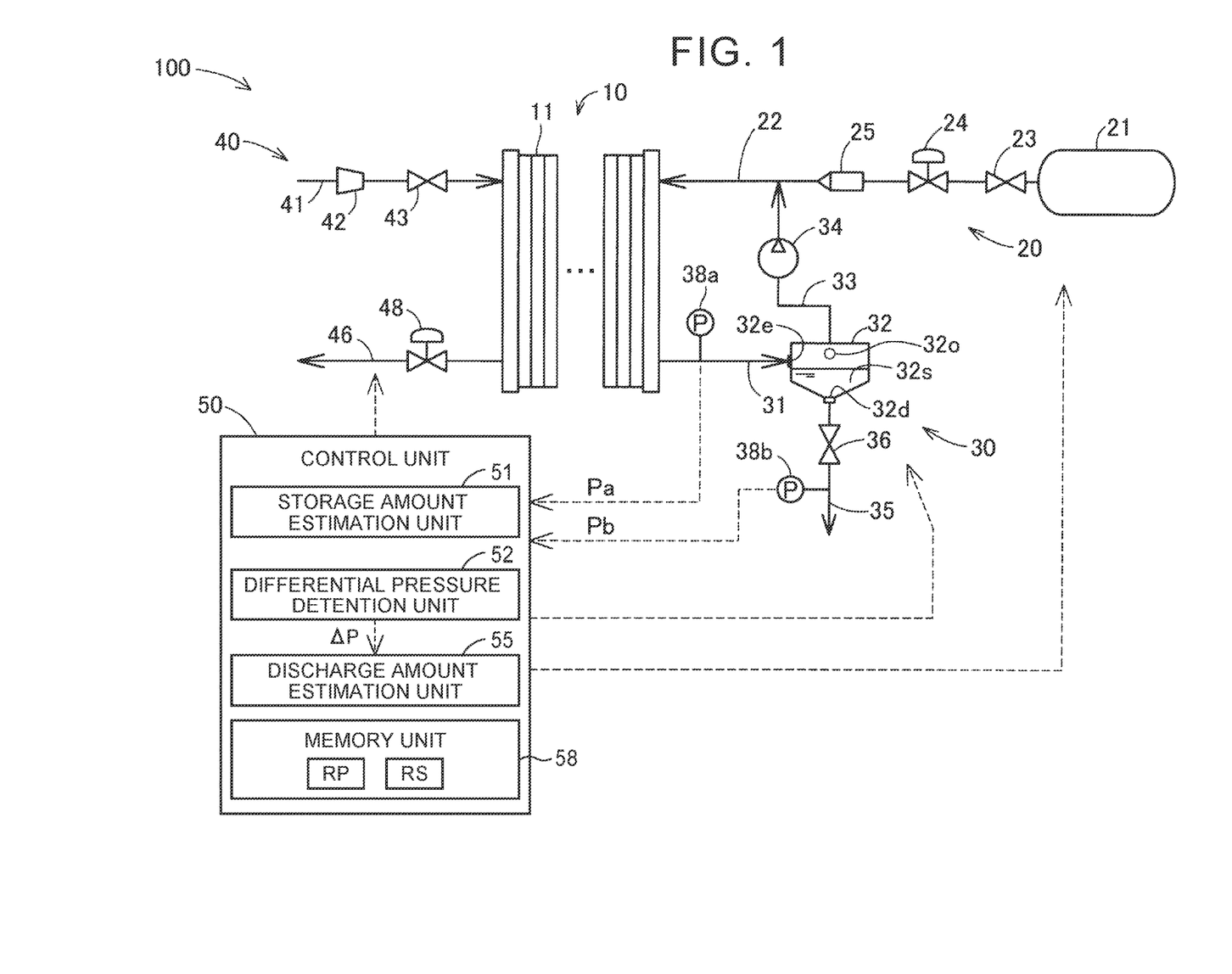
FIG. 1 is a schematic diagram showing a configuration of a fuel cell system.

FIG. 1 is a schematic diagram showing a configuration of a fuel cell system 100 according to a first embodiment. The fuel cell system 100 is mounted on, for example, a vehicle, and supplies electric power to a drive motor that generates a drive force and to auxiliary devices used in the vehicle.

The fuel cell system 100 includes a fuel cell 10 that is supplied with a fuel gas and an oxidant gas that are reaction gases to generate electric power. The fuel cell 10 is constituted by, for example, a polymer electrolyte fuel cell, and generates electric power by an electrochemical reaction between hydrogen serving as the fuel gas and oxygen serving as the oxidant gas. The fuel cell 10 has a stack structure in which a plurality of unit cells 11 are stacked. Each unit cell 11 is a power generating element that can generate electric power. The unit cell 11 includes a membrane electrode assembly, which is a power generator having electrodes disposed on opposite sides of an electrolyte membrane, and two separators between which the membrane electrode assembly is sandwiched. The electrolyte membrane is composed of a solid polymer thin film that exhibits good proton conductivity when it is in a wet state in which the solid polymer thin film contains water therein.

The fuel cell system 100 further includes a gas supply unit 20, a gas circulation unit 30, and a gas supply/discharge unit 40 as components for supplying a reaction gas to the fuel cell 10. The gas supply unit 20 supplies a fuel gas to an anode of the fuel cell 10. The gas supply unit 20 includes a tank 21 for storing a high-pressure fuel gas, a fuel gas pipe 22 connecting the tank 21 and an anode inlet of the fuel cell 10, a main stop valve 23, a regulator 24, and a supply device 25. The main stop valve 23, the regulator 24, and the supply device 25 are provided on the fuel gas pipe 22 in this order from an upstream side that is the tank 21 side. The main stop valve 23 is constituted by an electromagnetic valve, and opens and closes the fuel gas pipe 22 to control an outflow of the fuel gas from the tank 21. The regulator 24 is a pressure-reducing valve, and regulates a pressure in a portion of the fuel gas pipe 22 on an upstream side of the supply device 25. The supply device 25 is periodically driven to open and close so as to send out the fuel gas to the fuel cell 10. The supply device 25 is constituted by, for example, an injector that is an electromagnetically driven on-off valve that opens and closes at a set driving cycle.

The gas circulation unit 30 has a function of circulating a fuel gas contained in an exhaust gas discharged from the anode of the fuel cell 10 to the fuel cell 10 and a function of discharging drain water contained in the exhaust gas to the outside of the fuel cell system 100. The gas circulation unit 30 includes an exhaust gas pipe 31, a gas-liquid separator 32, a circulation pipe 33, a circulation pump 34, a drain pipe 35, and a drain valve 36. The exhaust gas pipe 31 is connected to an anode outlet of the fuel cell 10 and the gas-liquid separator 32. The exhaust gas pipe 31 leads, to the gas-liquid separator 32, exhaust gas on the anode side, which contains a fuel gas that was not used for power generation at the anode, an inert gas, water vapor or water in a liquid water state.

The gas-liquid separator 32 separates a liquid component and a gas component contained in the exhaust gas flowing therein through the exhaust gas pipe 31, and stores the liquid component as drain water in a liquid state. Here, the "liquid component" means water in a liquid state. The drain water stored in the gas-liquid separator 32 is liquid water in a liquid state.

A body of the gas-liquid separator 32 is constituted by a hollow container into which exhaust gas can be introduced. The gas-liquid separator 32 has an exhaust gas inlet 32e connected to the exhaust gas pipe 31 and an exhaust gas outlet 32o connected to the circulation pipe 33. The gas component in the exhaust gas flowing into the gas-liquid separator 32 through the exhaust gas inlet 32e flows along an inner wall surface of the gas-liquid separator 32, and is led to the exhaust gas outlet 32o. On the other hand, the water in the exhaust gas collides with the inner wall surface of the gas-liquid separator 32, adheres to the inner wall surface in a state of liquid water, and is led to a lower region of the gas-liquid separator 32. Of an internal space of the gas-liquid separator 32, a portion located below the exhaust gas inlet 32e and the exhaust gas outlet 32o functions as a storage portion 32s in which the drain water is collected and stored. A lower end of the storage portion 32s is provided with a drain port 32d through which drain water stored in the storage portion 32s flows out. A blade for promoting gas-liquid separation may be provided in the gas-liquid separator 32.

The circulation pipe 33 connects the exhaust gas outlet 32o of the gas-liquid separator 32 and a portion of the fuel gas pipe 22 on a downstream side of the supply device 25. The gas component separated from the exhaust gas in the gas-liquid separator 32 is led to the fuel gas pipe 22 through the circulation pipe 33, and is circulated to the anode of the fuel cell 10 through the fuel gas pipe 22. The circulation pump 34 is provided on the circulation pipe 33 to promote circulation of the gas component to the anode of the fuel cell 10.

The drain pipe 35 is connected to the drain port 32d of the gas-liquid separator 32. The drain pipe 35 is provided with the drain valve 36 for opening and closing the drain pipe 35. In the fuel cell system 100, while the drain valve 36 is closed, the drain water is stored in the storage portion 32s of the gas-liquid separator 32. The drain water stored in the storage portion 32s is discharged to the outside of the fuel cell system 100 through the drain pipe 35 when the drain valve 36 is opened. A downstream end of the drain pipe 35 may be connected to a discharge pipe 46 of the gas supply/discharge unit 40.

The gas circulation unit 30 further includes two pressure measurement units 38a, 38b. As the two pressure measurement units 38a, 38b, for example, pressure sensors can be used. A first pressure measurement unit 38a is attached to the exhaust gas pipe 31, and measures a pressure in the exhaust gas pipe 31 as a pressure on an upstream side of the storage portion 32s of the gas-liquid separator 32. A second pressure measurement unit 38b is attached to a portion of the drain pipe 35 on a downstream side of the drain valve 36, and measures a pressure in the drain pipe 35 as a pressure on the downstream side of the drain valve 36. Measurement results of the pressure measurement units 38a, 38b are transmitted to a differential pressure detection unit 52 described later.

The gas supply/discharge unit 40 has a function of supplying an oxidant gas to a cathode of the fuel cell 10 and a function of discharging exhaust gas discharged from the cathode of the fuel cell 10 to the outside of the fuel cell system 100. In the present embodiment, oxygen contained in the outside air is supplied to the fuel cell 10 as the oxidant gas. The gas supply/discharge unit 40 includes a supply pipe 41, a compressor 42, an on-off valve 43, the discharge pipe 46, and a pressure regulating valve 48. The supply pipe 41 has a first end communicating with the outside air and a second end connected to a cathode inlet of the fuel cell 10. The compressor 42 compresses the outside air taken therein through the first end of the supply pipe 41 and sends out the compressed air to the on-off valve 43 provided at the second end of the supply pipe 41. The on-off valve 43 is normally closed, and is opened with a pressure of the compressed gas sent out from the compressor 42 to allow the compressed gas to flow into the cathode of the fuel cell 10. The discharge pipe 46 is connected to a cathode outlet, and leads the exhaust gas discharged from the cathode of the fuel cell 10 to the outside of the fuel cell system 100. The pressure regulating valve 48 is provided on the discharge pipe 46 and regulates a back pressure on the cathode side of the fuel cell 10.

The fuel cell system 100 further includes a control unit 50 for controlling operation of the fuel cell system 100. The control unit 50 is constituted by an electronic control unit (ECU) including at least one processor and a main storage device. The control unit 50 performs various functions for controlling the fuel cell system 100 by executing programs and commands read into the main storage device by the processor. At least part of the functions of the control unit 50 may be configured by a hardware circuit.

The control unit 50 controls the gas supply unit 20, the gas circulation unit 30, and the gas supply/discharge unit 40 to control power generation of the fuel cell 10. Specifically, the control unit 50 controls the driving cycle of the supply device 25 and a rotation speed of the circulation pump 34 so as to control a supply amount and a supply pressure of the fuel gas supplied to the fuel cell 10. The control unit 50 controls a rotation speed of the compressor 42 to control a supply amount of the oxidant gas supplied to the fuel cell 10, and controls an opening degree of the pressure regulating valve 48 to regulate a pressure on the cathode side of the fuel cell 10.

The control unit 50 controls opening and closing of the drain valve 36 in the gas circulation unit 30 during power generation of the fuel cell 10, and performs drain valve control for controlling storage and discharge of the drain water in the gas-liquid separator 32. Although details will be described later, in the drain valve control of the first embodiment, the control unit 50 determines a valve closing timing of the drain valve 36 after opening of the drain valve 36, based on an estimated value of a storage amount of drain water stored in the gas-liquid separator 32 during power generation of the fuel cell 10 and an estimated value of a discharge amount of the drain water discharged from the gas-liquid separator 32.

The control unit 50 has a function as a storage amount estimation unit 51 that calculates the estimated value of the storage amount of the drain water stored in the gas-liquid separator 32. The method for estimating the storage amount will be described later. The control unit 50 further has a function as the differential pressure detection unit 52 that detects a differential pressure ΔP used in calculating the estimated value of the discharge amount, and a function as a discharge amount estimation unit 55 for calculating an estimated value of the discharge amount of the drain water discharged from the gas-liquid separator 32. The differential pressure detection unit 52 calculates the differential pressure ΔP by subtracting a pressure Pb on the downstream side of the drain valve 36, which is measured by the second pressure measurement unit 38b, from a pressure Pa on the upstream side of the storage portion 32s of the gas-liquid separator 32, which is measured by the first pressure measurement unit 38a. The discharge amount estimation unit 55 calculates the estimated value of the discharge amount using a first relationship RP and a second relationship RS stored in a memory unit 58 provided in the control unit 50.

Figure 2:
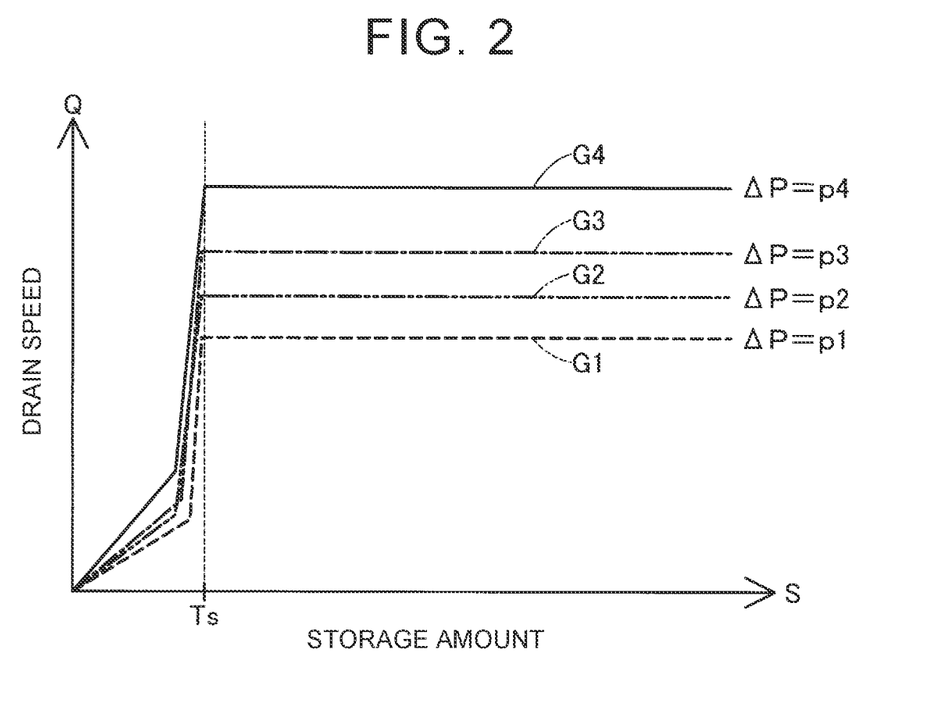
FIG. 2 is a reference diagram illustrating the principle of a method for calculating an estimated value of a discharge amount.

With reference to FIG. 2, the principle of a method for calculating the estimated value of the discharge amount of the drain water, which is performed by the discharge amount estimation unit 55 will be described. FIG. 2 is a graph showing a relationship between a storage amount S in the gas-liquid separator 32 and a drain speed Q of the drain water discharged from the drain port 32d of the gas-liquid separator 32. The drain speed Q corresponds to a flow rate of the drain water discharged from the drain port 32d. This graph was obtained by experiments conducted by the inventors of the present application. FIG. 2 shows graphs G1 to G4 obtained for different differential pressures ΔP. The differential pressures ΔP when the graphs G1 to G4 are obtained are p1, p2, p3 and p4, respectively. Here, p1, p2, p3, and p4 satisfy the relationship of p1<p2<p3<p4.

The inventors of the present application have obtained the following findings through experiments. The drain speed Q is obtained as a substantially constant value until the storage amount S in the gas-liquid separator 32 decreases to a certain value Ts, and the larger the differential pressure ΔP is, the larger the drain speed Q is. The reason why the drain speed Q is obtained as a constant value is that there is no outflow of the gas component through the drain port 32d and only the drain water is discharged so that the differential pressure ΔP is maintained substantially constant. The reason why the larger the differential pressure ΔP, the larger the drain speed Q, is that the differential pressure ΔP serves as a drive force for discharging the drain water from the drain port 32d. The relationship between the drain speed Q and the differential pressure ΔP in this case is represented by the following equation (1).

$$Q = Qr \times \sqrt{\frac{\Delta P}{\Delta Pr}} \div \sqrt{\frac{\rho}{\rho r}} \quad \text{Equation (1)}$$

ρ: liquid water density determined in accordance with temperature of drain water
Qr: constant determined in advance and representing reference flow rate of drain water
ΔPr: constant determined in advance and representing reference value of differential pressure ΔP
ρr: constant determined in advance and representing reference value of liquid water density On the other hand, when the storage amount S in the gas-liquid separator 32 is equal to or smaller than Ts, the drain speed Q decreases as the storage amount S decreases. Thus, the reason why the relationship between the storage amount S and the drain speed Q changes with Ts serving as a boundary is that when the storage amount S becomes equal to or smaller than Ts, the gas component of the exhaust gas starts to be discharged together with the drain water from the drain port 32d of the gas-liquid separator 32. Hereinafter, a storage amount Ts, which serves as the boundary between a state in which only the drain water flows out from the drain port 32d of the gas-liquid separator 32 and a state in which the gas component flows out together with the drain water from the drain port 32d, is also referred to as "threshold storage amount Ts". The relationship between the storage amount S and the drain speed Q when the storage amount S is equal to or smaller than the threshold storage amount Ts is determined depending on a structure of the gas-liquid separator 32.

Based on the above findings, the discharge amount estimation unit 55 obtains the drain speed Q using the first relationship RP that is prepared in advance and in which the drain speed Q is uniquely determined with respect to the pressure difference ΔP during a first period in which the storage amount S is larger than the threshold storage amount Ts, and calculates the estimated value of the discharge amount using the drain speed Q. Hereinafter, this calculation process is also referred to as "first calculation process". In the memory unit 58 of the control unit 50, the above equation (1) is stored as the first relationship RP in a nonvolatile manner. In the first calculation process of the present embodiment, the differential pressure detection unit 52 obtains the drain speed Q with respect to the differential pressure ΔP using the above equation (1) representing the first relationship RP. In the first embodiment, for the liquid water density ρ in the above equation (1), a value obtained with respect to an average temperature of the drain water, which is obtained in advance by experiment, is used as a predetermined value. In other embodiments, the liquid water density p obtained with respect to an actually measured value of the temperature of the drain water may be used.

During a second period in which the storage amount S is equal to or smaller than the threshold storage amount Ts, the discharge amount estimation unit 55 obtains the drain speed Q that is determined in accordance with the storage amount S in the second relationship RS that is prepared in advance and in which the drain speed Q decreases with a decrease in the storage amount S, and calculates the estimated value of the discharge amount using the drain speed Q. This calculation process is also referred to as "second calculation process". In the second calculation process of the present embodiment, the discharge amount estimation unit 55 obtains the drain speed Q with respect to the storage amount S using a map MP indicating the second relationship RS, which is described below. The map MP is stored as the second relationship RS in the memory unit 58 in a nonvolatile manner, and the discharge amount estimation unit 55 reads out the map MP from the memory unit 58 when performing the second calculation process.

Figure 3:
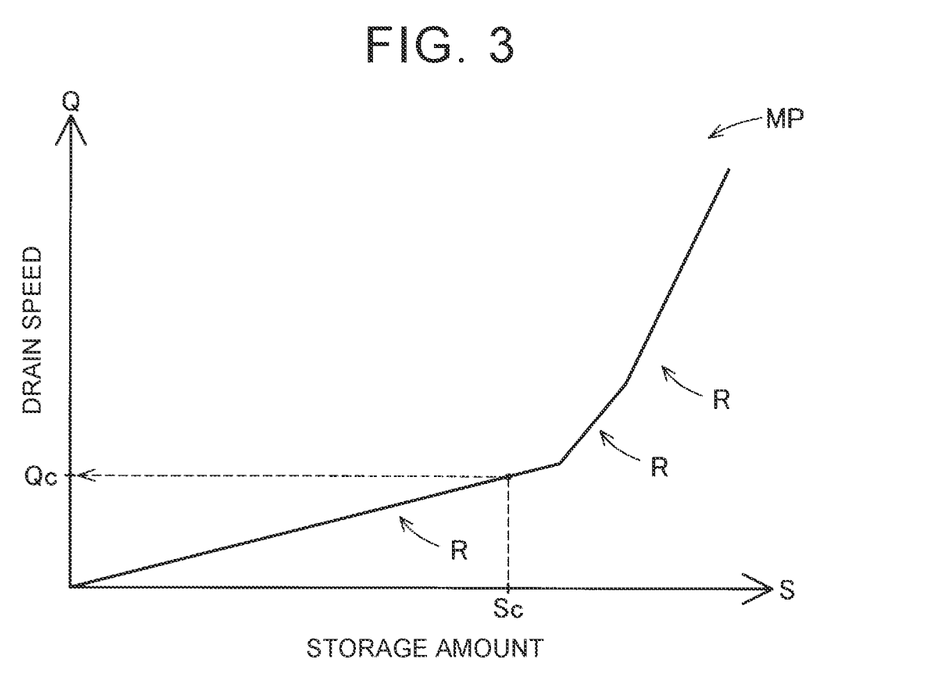
FIG. 3 is an explanatory diagram showing an example of a map indicating a second relationship.

FIG. 3 is an explanatory diagram showing an example of the map MP indicating the second relationship RS used by the discharge amount estimation unit 55. In the map MP, a relationship is defined in which the obtained drain speed Q decreases as the storage amount S decreases, based on the graphs G1 to G4 in FIG. 2. Variations in the graphs G1 to G4 in FIG. 2 for the differential pressures ΔP are regarded as being within a margin of error and are ignored in the map MP. The map MP includes a plurality of regions R having different rates of change in the drain speed Q with respect to the storage amount S. In the map MP, the rate of change in the drain speed Q with respect to the storage amount S is smaller in the region R where the storage amount S is smaller.

Note that, as described above, the relationship between the storage amount S and the drain speed Q during the second period is determined depending on the structure of the gas-liquid separator 32. Thus, the map MP is not limited to the map shown in FIG. 3. The map MP may be set so that, for example, the drain speed Q changes with respect to the storage amount S such that the graph extends in a curved manner. Further, different maps MP for the individual differential pressures ΔP may be prepared.

Figure 4:
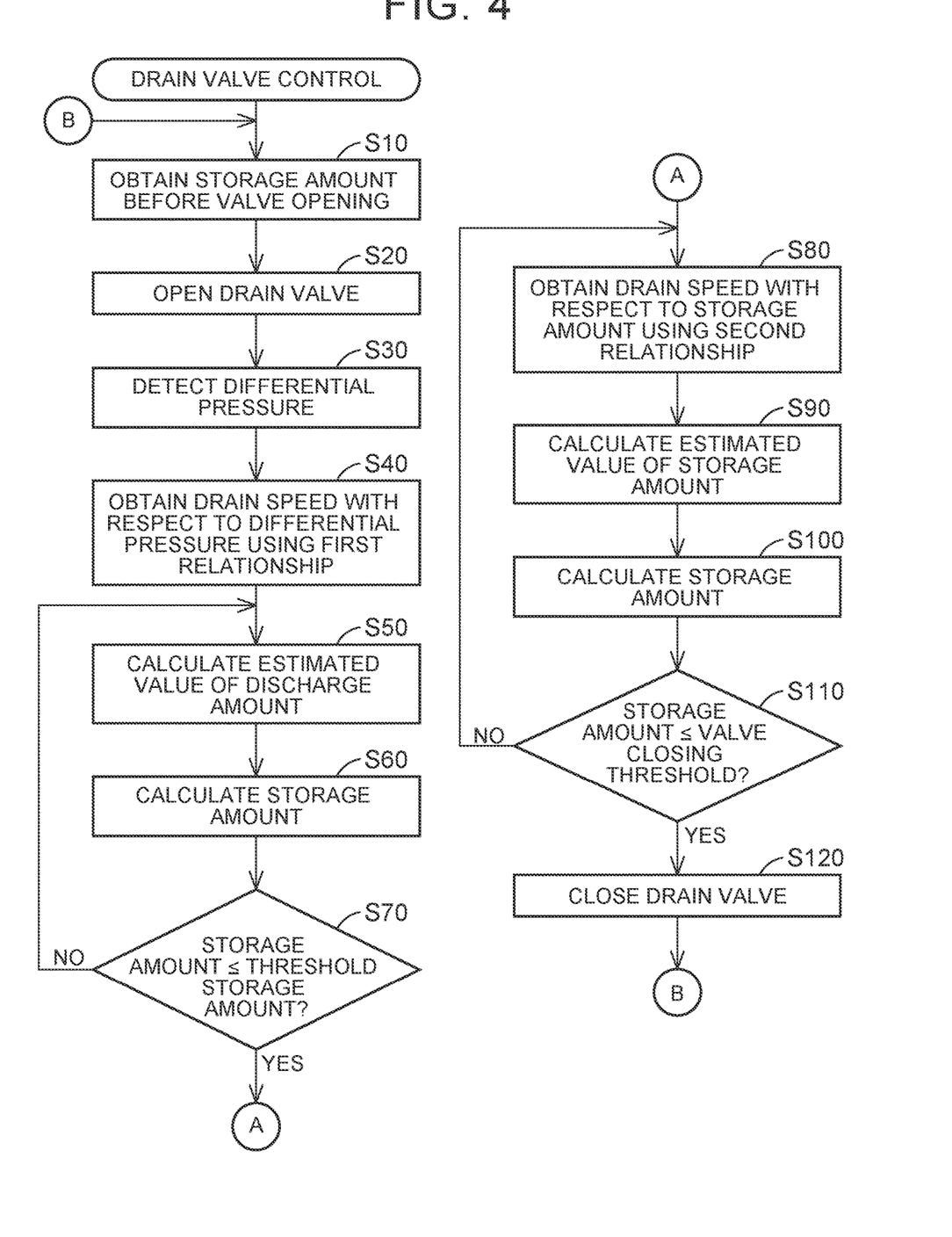
FIG. 4 is an explanatory diagram showing a flow of drain valve control according to a first embodiment.

FIG. 4 is an explanatory diagram showing a flow of drain valve control performed by the control unit 50. This drain valve control is performed during power generation of the fuel cell 10. In the drain valve control, when the valve opening timing of the drain valve 36 arrives, the drain valve 36 is opened and the drain water stored in the gas-liquid separator 32 while the drain valve 36 is closed is discharged to the outside of the fuel cell system 100 through the drain pipe 35. In addition, as described above, the valve closing timing of the drain valve 36 after the drain water is discharged is determined using the estimated value of the discharge amount, which is obtained by the discharge amount estimation unit 55.

In step S10, the storage amount estimation unit 51 of the control unit 50 calculates a storage amount Si before valve opening. The storage amount Si before valve opening is the estimated value representing the storage amount of the drain water stored in the gas-liquid separator 32 from a time when the drain valve 36 was previously closed until the drain valve 36 is opened. The storage amount estimation unit 51 calculates the amount of water generated by the fuel cell 10 during the period in which the drain valve 36 is closed based on the amount of electric power generated by the fuel cell 10 during that period, and calculates the storage amount Si before valve opening based on the amount of generated water and the flow rate of the reaction gas.

In step S20, the control unit 50 opens the drain valve 36 when a predetermined valve opening condition is satisfied. In the present embodiment, the control unit 50 opens the drain valve 36 when the storage amount Si before valve opening is equal to or larger than a predetermined upper limit value of the storage amount. In other embodiments, the control unit 50 may open the drain valve 36 when a predetermined time has elapsed from the previous valve closing timing of the drain valve 36. Further, the control unit 50 may open the drain valve 36 when a driver of the vehicle instructs drainage by an operation on an operation unit (not shown) such as a drain switch.

In step S30, the differential pressure detection unit 52 detects the differential pressure ΔP as follows. The differential pressure detection unit 52 obtains from the first pressure measurement unit 38a the first pressure Pa representing the pressure on the upstream side of the storage portion 32s, and obtains from the second pressure measurement unit 38b the second pressure Pb representing the pressure on the downstream side of the drain valve 36. The differential pressure detection unit 52 calculates the differential pressure ΔP by subtracting the second pressure Pb from the first pressure Pa.

Steps S40 and S50 correspond to the first calculation process of calculating the estimated value of the discharge amount during the first period in which the storage amount S is larger than the threshold storage amount Ts. In step S40, the discharge amount estimation unit 55 obtains the drain speed Q with respect to the differential pressure ΔP detected in step S30, using the above equation (1) representing the first relationship RP stored in the memory unit 58. In step S50, an estimated value Da of the discharge amount is calculated by integrating the drain speed Q with the elapsed time since the drain valve 36 is opened.

In step S60, the storage amount estimation unit 51 subtracts the estimated value Da of the discharge amount, which is calculated in step S50, from the storage amount Si before valve opening, which is obtained in step S10, to calculate a storage amount Sc that is an estimated value representing the current storage amount of the drain water in the gas-liquid separator 32. In step S70, the control unit 50 determines whether the current storage amount Sc calculated in step S60 is equal to or smaller than the threshold storage amount Ts. When the current storage amount Sc is larger than the threshold storage amount Ts, the control unit 50 repeats the process of steps S50 to S70. Note that, during the execution period of the first calculation process, the drain port 32d is maintained to be closed with the drain water, and therefore it is expected that the differential pressure ΔP does not change and the drain speed Q does not change. Thus, step S40 is not executed, and the process of steps S50 to S70 is repeated.

When it is detected that the current storage amount Sc is equal to or smaller than the threshold storage amount Ts, the control unit 50 starts the second calculation process performed by the discharge amount estimation unit 55 in step S80 and the subsequent steps. Hereinafter, the current storage amount Sc when the second calculation process is started to be performed is also referred to as "storage amount initial value Ss in the second period". In the second calculation process, the discharge amount estimation unit 55 calculates, in predetermined cycles, an estimated value Dt of the discharge amount for each cycle and adds up the estimated values Dt of the discharge amount for respective cycles, so as to calculate an estimated value Db of the discharge amount during the second period in which the storage amount S is equal to or smaller than the threshold storage amount Ts.

In step S80, the discharge amount estimation unit 55 reads out the map MP described with reference to FIG. 3 from the memory unit 58, and obtains a current drain speed Qc for the current storage amount Sc using the map MP as the second relationship RS. In step S90, the discharge amount estimation unit 55 performs time integration on the drain speed Qc obtained in step S80 with time of one cycle, so as to calculate the estimated value Dt of the discharge amount in the current cycle. The discharge amount estimation unit 55 calculates the estimated value Db of the discharge amount in the second period up to the current cycle by adding the estimated value Dt of the discharge amount in the current cycle to the sum of the estimated values Dt up to the previous cycle. The "estimated value Db of the discharge amount in the second period" can be rephrased as "estimated value Db of the discharge amount in the execution period of the second calculation process".

In step S100, the storage amount estimation unit 51 calculates the current storage amount Sc. The storage amount estimation unit 51 calculates the current storage amount Sc by subtracting the estimated value Db of the discharge amount, which is calculated in step S90, from the storage amount initial value Ss in the second period. In step S110, the control unit 50 determines whether the current storage amount Sc is equal to or smaller than a predetermined valve closing threshold Sth. In the present embodiment, the valve closing threshold Sth is, for example, 0 cc to 10 cc. When the current storage amount Sc is larger than the valve closing threshold Sth, the control unit 50 repeats the process of steps S80 to S110. When the current storage amount Sc is equal to or smaller than the valve closing threshold Sth, the control unit 50 closes the drain valve 36 in step S120, and starts the drain valve control of the next cycle. The control unit 50 uses a final value of the storage amount Sc in the current cycle as an initial value of the storage amount Si before valve opening in the drain valve control of the next cycle.

Figure 5:
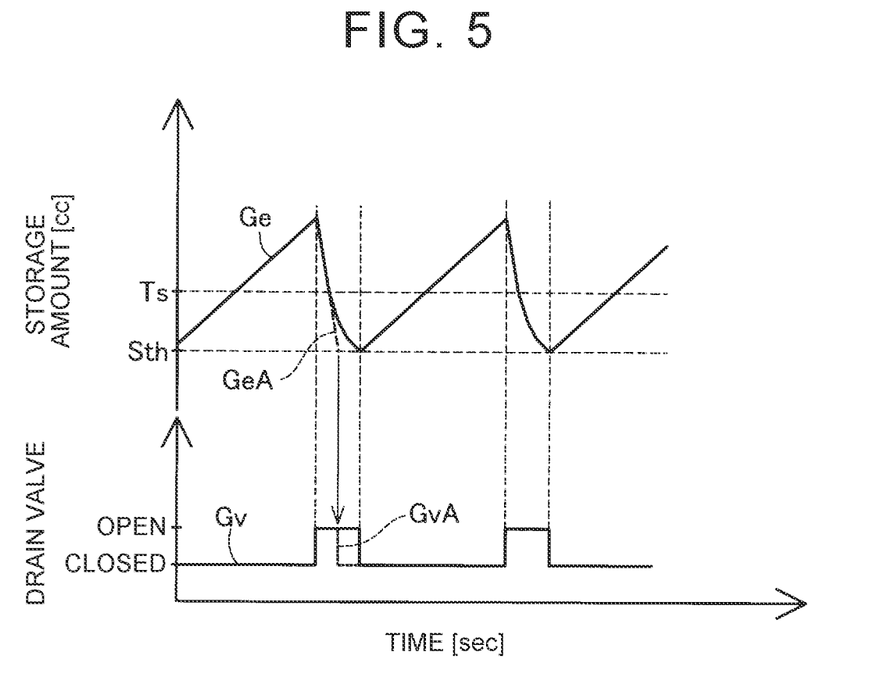
FIG. 5 is an explanatory diagram showing a result of an experiment when the drain valve control is performed.
Figure 6:
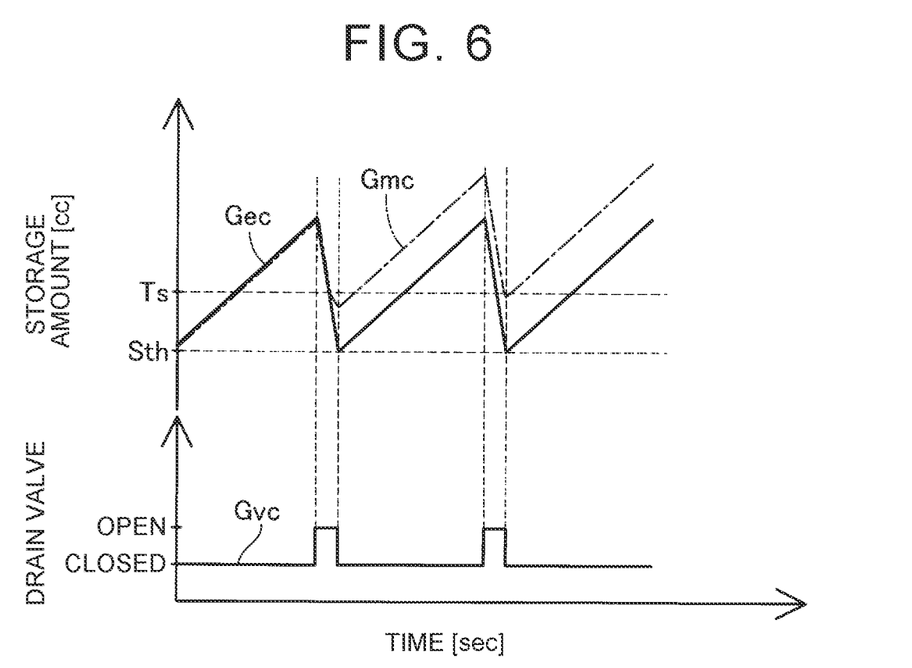
FIG. 6 is an explanatory diagram showing a result of an experiment in a comparative example.

With reference to FIGS. 5 and 6, the effects of the drain valve control of the present embodiment will be described. FIG. 5 is an explanatory diagram showing a result of an experiment conducted by the inventors. In FIG. 5, a solid line graph Ge indicating a temporal change in the estimated value of the storage amount of the drain water in the gas-liquid separator 32 when the drain valve control according to the present embodiment is performed is shown in an upper part, and a graph Gv indicating the opening-closing timing of the drain valve 36 is shown in a lower part. The estimated value of the storage amount corresponds to the values of the storage amount calculated in steps S10, S60, and S100.

FIG. 6 is an explanatory diagram showing a result of an experiment in a comparative example. In an upper part of FIG. 6, a solid line graph Gec indicating a temporal change in the estimated value of the storage amount of the drain water in the gas-liquid separator 32 and a long dashed short dashed line graph Gmc indicating a temporal change in the actually measured value of the storage amount are shown. In a lower part of FIG. 6, a graph Gvc indicating the opening-closing timing of the drain valve 36 is shown. In this comparative example, the following control is performed. That is, after the drain valve 36 is opened, an estimated value of the discharge amount of the drain water is calculated only through the first calculation process, and when the estimated value of the storage amount of the drain water in the gas-liquid separator 32 calculated using the estimated value of the discharge amount becomes equal to or smaller than the valve closing threshold Sth, the drain valve 36 is closed.

FIG. 5 is referenced. In the drain valve control of the present embodiment, during the period after the drain valve 36 is opened, in which the storage amount S is equal to or smaller than the threshold storage amount Ts and the drain water and the gas component are discharged from the gas-liquid separator 32, the estimated value of the discharge amount is calculated through the second calculation process using the map MP in FIG. 3. Therefore, as indicated by the graph Ge, the rate of decrease in the storage amount after the storage amount S becomes equal to or smaller than the threshold storage amount Ts changes so as to decrease as the storage amount S decreases. Thus, in the drain valve control of the present embodiment, in the second calculation process, the discharge amount is estimated considering the actual change in the drain speed when the drain water and the gas component are simultaneously discharged from the drain port 32*d* of the gas-liquid separator 32. Therefore, accuracy of estimating the discharge amount is increased, and thus, the accuracy of estimating the storage amount is also increased.

In contrast, when the estimated value of the discharge amount is calculated only through the first calculation process, the estimated value of the storage amount decreases at a fixed rate as indicated by a broken line graph GeA in the upper part of FIG. 5. Thus, the valve closing threshold Sth is reached at a timing earlier than a timing in the case where switching to the second calculation process is performed, and the closing timing of the drain valve 36 is advanced as indicated by a broken line graph GvA in the lower part of FIG. 5. In this case, as indicated by the graphs Gec, Gmc of the comparative example in FIG. 6, the actual storage amount after the drain valve 36 is closed becomes larger than the valve closing threshold Sth, and storage of the drain water in the gas-liquid separator 32 is restarted with the drain water remaining in the gas-liquid separator 32. Then, with the estimated value of the storage amount showing a value lower than the actual storage amount, opening and closing of the drain valve 36 are repeated based on the estimated value of the storage amount. If storage and discharge of the drain water in the gas-liquid separator 32 are repeated in such a state, a difference between the estimated value and the actually measured value of the storage amount is accumulated to increase, which may cause the amount of drain water remaining in the storage portion 32*s* of the gas-liquid separator 32 to gradually increase. Thus, if a state in which a large amount of drain water remains in the storage portion 32*s* continues, a possibility that the drain water in the storage portion 32*s* enters the circulation pipe 33 increases. When the circulation pipe 33 is provided with the circulation pump 34, the drain water remaining in the storage portion 32*s* may be sucked up with the suction force of the circulation pump 34, which further increases the possibility that the drain water in the storage portion 32*s* enter the circulation pipe 33.

In the drain valve control of the present embodiment, the accuracy of estimating the discharge amount is increased as described above, which suppresses deviation of the estimated value of the storage amount from the actual storage amount. Therefore, the drain water is restrained from remaining in the gas-liquid separator 32 after drainage, so that it is possible to suppress occurrence of inconvenience described above due to the drain water remaining in the gas-liquid separator 32.

As described above, with the fuel cell system 100 of the present embodiment, it is possible to simply and accurately calculate, through the first calculation process, the estimated value of the discharge amount during the first period in which only drain water is discharged from the drain port 32*d* of the gas-liquid separator 32, based on the differential pressure ΔP. Further, through the second calculation process, it is possible to calculate with high accuracy the estimated value of the discharge amount during the second period in which the gas component is discharged together with the drain water from the drain port 32*d* of the gas-liquid separator 32. Thus, it is possible to accurately detect the amount of drain water stored in the gas-liquid separator 32 and to appropriately control the opening and closing of the drain valve 36 so as to restrain the drain water from remaining in the gas-liquid separator 32.

2. Second Embodiment

Figure 7:
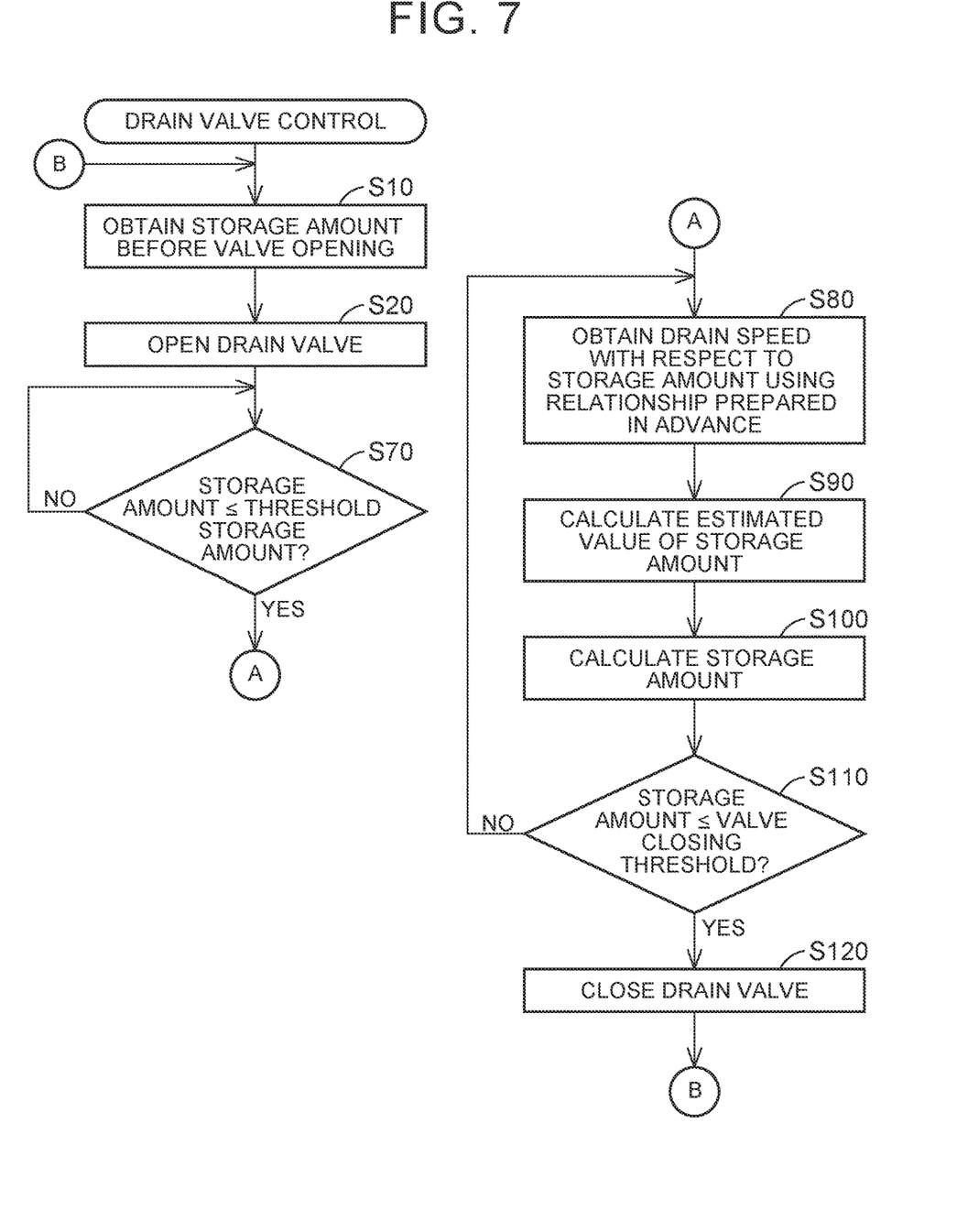
FIG. 7 is an explanatory diagram showing a flow of drain valve control according to a second embodiment.

FIG. 7 is an explanatory diagram showing a flow of a drain valve control according to a second embodiment. The drain valve control according to the second embodiment is substantially the same as the drain valve control according to the first embodiment except that steps S30 to S60 are omitted and the determination method in step S70 is different. The drain valve control of the second embodiment is performed in the fuel cell system 100 described in the first embodiment. In the second embodiment, the differential pressure detection unit 52 of the control unit 50 may be omitted.

In steps S10 and S20, the storage amount Si before valve opening is obtained as described in the first embodiment, and the drain valve 36 is opened when the valve opening condition is satisfied. In step S70, the control unit 50 determines whether the storage amount in the gas-liquid separator 32 is equal to or smaller than the threshold storage amount Ts based on a change in the pressure Pa measured by the first pressure measurement unit 38a. As described in the first embodiment, when the storage amount in the gas-liquid separator 32 becomes equal to or smaller than the threshold storage amount Ts, the gas component of the exhaust gas flows out together with the drain water from the drain port 32d. Therefore, the pressure Pa measured by the first pressure measurement unit 38a decreases. When detecting the decrease in the pressure Pa, the control unit 50 determines that the storage amount in the gas-liquid separator 32 has become equal to or smaller than the threshold storage amount Ts.

The control unit 50 waits until it is detected in step S70 that the storage amount has become equal to or smaller than the threshold storage amount Ts based on the pressure Pa. When it is detected that the storage amount has become equal to or smaller than the threshold storage amount Ts, the control unit 50 starts the process in step S80 and the subsequent steps with the threshold storage amount Ts set as the current storage amount Sc.

Content of the process in steps S80 to S120 is almost the same as that described in the first embodiment. Also in the second embodiment, the current drain speed Qc with respect to the current storage amount Sc is obtained in step S80 using a relationship prepared in advance and corresponding to the second relationship RS described in the first embodiment, and the estimated value of the discharge amount is calculated using the drain speed Qc in step S90.

In the drain valve control of the second embodiment, the first calculation process described in the first embodiment can be omitted, so that the valve closing timing of the drain valve 36 can be determined more easily. In addition, with the fuel cell system 100 and the control method thereof according to the second embodiment, various functions and effects similar to those described in the first embodiment can be obtained.

3. Other Embodiments

The various configurations described in the above embodiments can be modified as follows, for example. Each of the other embodiments described below is positioned as an example of an embodiment for carrying out the technique according to the present disclosure, similarly to the above embodiments.

Other Embodiment 1

The first relationship RP used for obtaining the drain speed Q in the first calculation process need not be represented by the above equation (1), and may be represented by a map as the second relationship RS used in the second calculation process. Further, the second relationship RS used for obtaining the drain speed Qc in the second calculation process need not be represented by the map MP shown in FIG. 3 and may be represented by a function or an arithmetic expression. The second relationship RS need not include the regions R having different rates of change in the drain speed with respect to the storage amount, and the second relationship RS may be a relationship in which the drain speed changes at a fixed rate with respect to the storage amount.

Other Embodiment 2

The estimated value of the discharge amount calculated in the first calculation process or the second calculation process may be used for control other than drain valve control. The estimated value of the discharge amount may be used, for example, to determine water balance in the fuel cell 10 during power generation. In addition, the drain valve control may be performed during a period other than the period of power generation by the fuel cell 10. The drain valve control may be performed, for example, in a scavenging process for the fuel cell 10, which is performed after the power generation of the fuel cell is stopped.

Other Embodiment 3

In the second calculation process, the estimated value of the discharge amount need not be sequentially and repeatedly calculated in predetermined cycles. In the second calculation process, for example, the estimated value of the discharge amount may be calculated in irregular cycles determined by random numbers.

Other Embodiment 4

The second pressure measurement unit 38b may be omitted. In this case, the differential pressure detection unit 52 may detect the differential pressure ΔP using the measurement result of the pressure measurement unit 38a and an outside air pressure. The outside air pressure in this case need not be an actually measured value, and an average known value may be used.

4. Others

In the above embodiments, some or all of the functions and processes implemented by software may be implemented by hardware. In addition, some or all of the functions and processes implemented by hardware may be implemented by software. As the hardware, for example, various circuits such as an integrated circuit, a discrete circuit, or a circuit module obtained by combining those circuits can be used.

The technique of the present disclosure is not limited to the above-described embodiments, examples, and modifications, and can be implemented with various configurations without departing from the scope thereof. For example, the technical features in the embodiments, examples, and modifications corresponding to the technical features in each mode described in the Summary may appropriately be replaced or combined in order to solve some or all of the issues described above, or in order to achieve some or all of the above-described effects. In addition, besides the technical features that are defined to be nonessential in the specification, technical features that are not defined to be essential in the specification may be deleted as appropriate.

What is claimed is:
1. A fuel cell system comprising:
a fuel cell configured to be supplied with a fuel gas and an oxidant gas to generate electric power;
an exhaust gas pipe that is connected to an anode of the fuel cell and into which exhaust gas of the fuel cell flows;

a gas-liquid separator connected to the exhaust gas pipe and configured to separate the exhaust gas into drain water that is liquid water and a gas component that includes the fuel gas, the gas-liquid separator having a storage portion configured to store the drain water;

a circulation pipe connected to the gas-liquid separator and configured to circulate the gas component to the anode of the fuel cell;

a drain pipe connected to the storage portion and having a drain valve configured to open and close the drain pipe, the drain pipe being configured to discharge the drain water from the gas-liquid separator when the drain valve is open;

a differential pressure detection unit configured to detect a differential pressure between a pressure on an upstream side of the storage portion and a pressure on a downstream side of the drain valve; and a control unit configured to control power generation of the fuel cell, calculate an estimated value of a storage amount of the drain water stored in the gas-liquid separator, and calculate an estimated value of a discharge amount of the drain water discharged from the gas-liquid separator while the drain valve is open, wherein the control unit is configured to:

(i) perform, when the estimated value of the storage amount is larger than a predetermined threshold storage amount, a first calculation process of calculating the estimated value of the discharge amount after the drain valve is opened, based on a drain speed of the drain water discharged from the gas-liquid separator, which is determined with respect to the differential pressure in a first relationship, the first relationship being prepared in advance with the drain speed uniquely defined with respect to the differential pressure; and (ii) perform, when the estimated value of the storage amount is equal to or smaller than the predetermined threshold storage amount, a second calculation process of calculating the estimated value of the discharge amount, based on a current drain speed obtained with respect to an estimated value of a current storage amount in a second relationship that is prepared in advance and in which the drain speed decreases as the estimated value of the storage amount decreases.

2. The fuel cell system according to claim 1, wherein the control unit is configured such that, in the second calculation process, the control unit obtains, in each of predetermined cycles, the drain speed with respect to the estimated value of the storage amount and performs time integration so as to calculate the estimated value of the discharge amount for the each of the cycles, and adds up the estimated value of the discharge amount for the each of the cycles so as to calculate the estimated value of the storage amount during a period in which the second calculation process is performed.

3. The fuel cell system according to claim 1, wherein the second relationship includes a plurality of regions with different rates of change in the drain speed with respect to the estimated value of the storage amount.

4. The fuel cell system according to claim 1, wherein the control unit is configured to close the drain valve, after the estimated value of the storage amount calculated based on the estimated value of the discharge amount becomes equal to or smaller than a predetermined valve closing threshold after the drain valve is opened.

* * * * *